United States Patent
Gorajala Chandra et al.

(10) Patent No.: US 10,038,594 B2
(45) Date of Patent: *Jul. 31, 2018

(54) CENTRALIZED MANAGEMENT OF ACCESS POINTS

(71) Applicant: Fortinet, Inc., Sunnyvale, CA (US)

(72) Inventors: Sekhar Sumanth Gorajala Chandra, San Jose, CA (US); Selvam Thangaraj, Fremont, CA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/585,465

(22) Filed: May 3, 2017

(65) Prior Publication Data

US 2017/0237617 A1 Aug. 17, 2017

Related U.S. Application Data

(63) Continuation of application No. 15/076,966, filed on Mar. 22, 2016, now Pat. No. 9,674,037, which is a
(Continued)

(51) Int. Cl.
*H04W 8/00* (2009.01)
*H04L 12/24* (2006.01)
(Continued)

(52) U.S. Cl.
CPC .......... *H04L 41/0823* (2013.01); *H04L 41/12* (2013.01); *H04L 41/22* (2013.01);
(Continued)

(58) Field of Classification Search
CPC ....... H04W 24/02; H04W 24/10; H04W 8/26; H04W 80/04; H04W 84/12; H04W 88/08; H04W 88/12; H04W 92/20; H04W 92/22
See application file for complete search history.

(56) References Cited

U.S. PATENT DOCUMENTS

| | | |
|---|---|---|
| 7,636,338 B1 | 12/2009 | Vu et al. |
| 7,756,542 B1 | 7/2010 | Kaiser et al. |

(Continued)

OTHER PUBLICATIONS

Non Final Rejection for U.S. Appl. No. 13/934,746 dated Aug. 10, 2015.
(Continued)

*Primary Examiner* — Mohamed Kamara
(74) *Attorney, Agent, or Firm* — Hamilton, DeSanctis & Cha LLP

(57) ABSTRACT

Systems and methods are provided for centralized access, control, and management of APs. According to one embodiment, multiple APs of a private IP network are decoupled from potentially transient IP addresses by assigning a unique identifier to each of the multiple APs by an AC. An AC GUI is presented by the AC to an administrator through which (i) commands are provided by the administrator and (ii) the administrator is provided with access to a first AP of the multiple APs responsive to a command received from the administrator though the AC GUI and based upon the first AP's assigned unique identifier. The first AP is accessed, controlled or debugged by the AC based on the command. The access to the first AP enables a first AP GUI of the first AP through which the network administrator is provided with an ability to issue multiple commands to the first AP.

20 Claims, 8 Drawing Sheets

Related U.S. Application Data continuation of application No. 13/934,746, filed on Jul. 3, 2013, now Pat. No. 9,331,900.

(51) Int. Cl.
*H04W 24/02* (2009.01)
*H04W 24/10* (2009.01)
*H04W 8/26* (2009.01)
*H04L 29/08* (2006.01)

(52) U.S. Cl.
CPC ............... *H04L 67/10* (2013.01); *H04W 8/26* (2013.01); *H04W 24/02* (2013.01); *H04W 24/10* (2013.01)

(56) References Cited

U.S. PATENT DOCUMENTS

| | | | |
|---|---|---|---|
| 8,126,145 B1* | 2/2012 | Tewari | H04L 9/0841 370/401 |
| 8,131,209 B1 | 3/2012 | Chen et al. | |
| 9,331,900 B2 | 5/2016 | Chandra et al. | |
| 9,674,037 B2 | 6/2017 | Chandra et al. | |
| 2006/0199586 A1 | 9/2006 | Yoon | |
| 2008/0084855 A1 | 4/2008 | Rahman | |
| 2009/0180430 A1* | 7/2009 | Fadell | H04L 12/5695 370/329 |
| 2010/0180016 A1 | 7/2010 | Bugwadia et al. | |
| 2010/0296496 A1* | 11/2010 | Sinha | H04W 12/12 370/338 |
| 2013/0039352 A1 | 2/2013 | Ruster et al. | |
| 2014/0073289 A1* | 3/2014 | Velasco | H04W 12/04 455/411 |
| 2015/0009901 A1 | 1/2015 | Chandra et al. | |
| 2016/0204987 A1 | 7/2016 | Chandra et al. | |

OTHER PUBLICATIONS

Notice of Allowance or U.S. Appl. No. 13/934,746 dated Apr. 1, 2016.

Non-Final Rejection for U.S. Appl. No. 15/076,966 dated Aug. 29, 2016.

Notice of Allowance for U.S. Appl. No. 15/076,966 dated Aug. 29, 2016.

* cited by examiner

400

```
enter AC
enter AP tree
enter AP_3
update AP_3
report AP_3
enter AP_7
debug AP_7
report AP_7
return AC
```

450

```
enter AC
enter AP tree
enter AP_3
update AP_3
report AP_3
return AC
enter AP_7
debug AP_7
report AP_7
return AC
```

Fig. 4a                    Fig. 4b

CENTRALIZED MANAGEMENT OF ACCESS POINTS

CROSS-REFERENCE TO RELATED APPLICATIONS

This application is a continuation of U.S. patent application Ser. No. 15/076,966, filed Mar. 22, 2016, now U.S. Pat. No. 9,674,037, which is a continuation of U.S. patent application Ser. No. 13/934,746, filed Jul. 3, 2013, now U.S. Pat. No. 9,331,900, both which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright© 2013-2017, Fortinet, Inc.

BACKGROUND

Field

Embodiments of the present invention generally relate to the field of computer networks. In particular, various embodiments relate to methods and systems for providing centralized access to controller-based access points for management, control and debugging of faults in access points, for example.

Description of the Related Art

Before the advent of wireless networks, setting up a computer network in a business, home, or school infrastructure required running of many cables through walls and ceilings in order to provide network access to all computer devices in the infrastructure. With the advent of wireless networks, the physical infrastructure requirements to support communication among computer devices were significantly lessened. A wireless Access Point (AP) is an example of a wireless network device that allows wireless devices to connect to a wired network. With the creation of APs, network users and/or administrators are able to add devices to a network with few or no cables. An AP can be directly connected to a wired Ethernet connection, providing wireless connections to other devices to utilize the wired connection of Ethernet using radio frequency links. APs can support connection of multiple computing devices to a single wired connection. APs can send and receive data packets using radio frequencies defined by the IEEE 802.11 wireless networking standard.

A wireless controller or Access Controller (AC) is a wireless network device that can be configured to manage one or more APs within a wireless network. ACs can be used in large organizations, for example, in which multiple computing devices or client devices need to be wirelessly connected to multiple APs, and where all the APs need to be managed and controlled efficiently at a single point. Existing ACs typically can be connected to and manage about 500 APs.

ACs can automatically receive and store details of all connected APs upon configuration of the APs within a network. ACs can also use stored details of the managed APs during transmission of packets within the wireless network and can also use the stored details to update or modify a particular managed AP, detect and identify faults in the managed APs and troubleshoot the identified faults so that data transmission continues in an uninterrupted manner.

Updating, modifying, troubleshooting or debugging faults of one or more managed APs within a large wireless network infrastructure can be a complex and challenging task for a network administrator. The network administrator may first need to identify the particular AP that is to be updated or modified or has experienced certain faults, which in turn depends upon the creation and maintenance of a list of Internet Protocol (IP) addresses of managed APs by the AC. As IP addresses of APs are capable of being changed periodically with or without administrator intervention, maintaining, updating, and monitoring the list of IP addresses is a cumbersome task.

In the context of existing ACs, the AC needs to initiate a separate telnet/SSH session for each managed AP to access or otherwise interact with the APs. As such, multiple telnet/SSH sessions are required to be run in parallel to monitor and manage multiple APs. Maintaining the multiple telnet/SSH sessions can be a processor and memory intensive task, resulting in decreased efficiency of the AC. The multiple telnet/SSH sessions also complicate the task of the network administrator.

Furthermore, since each AC is typically configured to manage a defined number of APs, in a large network infrastructure, a network administrator may need to manage multiple ACs, each of which in turn manages a defined set of APs.

In order to make connecting to, managing, and maintaining APs in a wireless network more simple, easy and efficient, it would be desirable to have centralized access to all AC-based APs in the network and more efficient mechanisms to monitor and manage such APs.

SUMMARY

Systems and methods are provided for centralized access, control, and management of APs within in a wireless network infrastructure. Systems and methods are also provided for assigning a unique identification number to one or more access points for easy and quick identification of access points, which decouples the identity of the AP from the potentially transient IP addresses of the APs. Systems and methods are also provided for minimizing complexity involved in accessing a cloud-based AC for managing APs from a remote location.

According to one embodiment, multiple Access Points (APs) of a private Internet Protocol (IP) network are decoupled from potentially transient IP addresses of the multiple APs by assigning a unique identifier to each of the multiple APs by an Access Controller (AC). An AC graphical user interface (GUI) is presented by the AC to a network administrator through which commands are provided by the network administrator and through which the network administrator is provided with access to a first AP of the multiple APs responsive to a command received from the network administrator though the AC GUI and based upon the first AP's assigned unique identifier. The first AP is accessed, controlled or debugged by the AC based on the command. The access to the first AP enables a first AP GUI of the first AP through which the network administrator is provided with an ability to issue multiple commands to the first AP.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIGS. 4A and 4B illustrate an exemplary command line interfaces for managing access points in accordance with an embodiment of the present invention.

DETAILED DESCRIPTION

Figure 1:
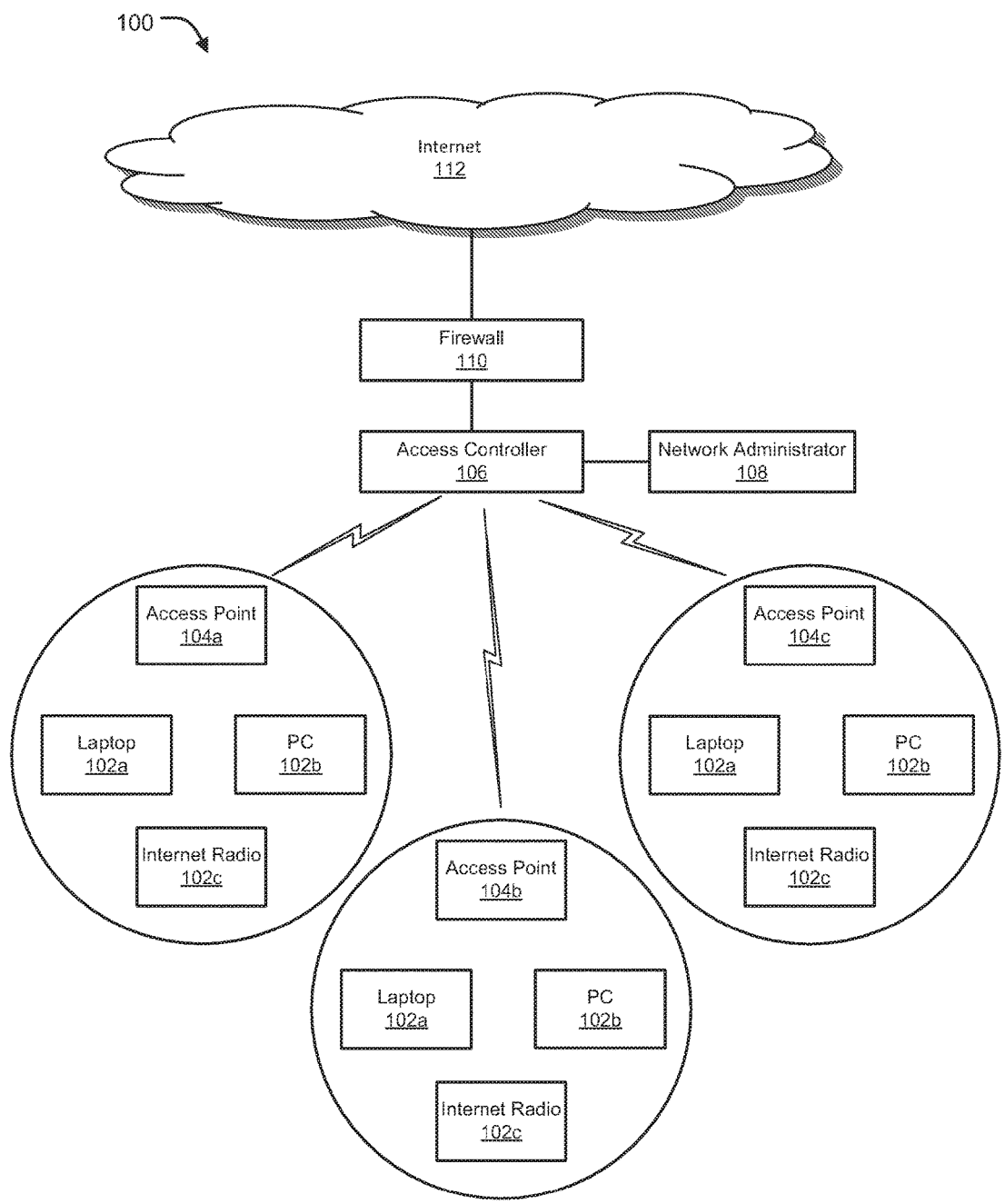
FIG. 1 illustrates an exemplary network architecture in accordance with an embodiment of the present invention.

Systems and methods are provided for centralized access, control, and management of Access Points (APs) within a wireless network infrastructure. Systems and methods are also provided for assigning a unique identification number to one or more access points for easy and quick identification of access points, which decouples the identity of the AP from the potentially transient IP addresses of the APs. Systems and methods are also provided for minimizing complexity involved in accessing a cloud-based AC for managing APs from a remote location.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of centralizing access to access controller based access points, it should be appreciated that the same has been done merely to illustrate the invention in an exemplary manner and any other purpose or function for which the explained structure or configuration can be used, is covered within the scope o the present disclosure.

Embodiments of present disclosure and their advantages are best understood by reference to FIG. 1. FIG. 1 illustrates an exemplary network architecture 100 in accordance with an embodiment of the present invention. It should be appreciated that even though the present architecture 100 has been described with reference to a specific layout, any other network layout is completely within the scope of the present invention.

As illustrated in FIG. 1, architecture 100 comprises multiple groups of computing devices such as Laptops 102a, PCs 102b, and Internet Radio 102c, among other such computing devices that are together referred to as 102 hereinafter. Such computing devices 102 can be configured in one or more groups based on multiple parameters such as geographical location, access controls, security provisions, among other like parameters. According to one embodiment, each group of computing devices 102 can be operatively coupled with an access point 104a, 104b . . . 104c, collectively referred to as access points 104 hereinafter. Access Points (APs), also interchangeably referred to as wireless APs, typically relate to nodes on a wireless LAN and act as a central transmitter and receiver of WLAN radio signals to support wireless communication standards. Each AP can include a wireless communication unit that transmits/receives packets according to IEEE 802.11 standard to/from a plurality of terminals.

According to one embodiment, architecture 100 further comprises one or more access controllers (ACs) 106, wherein each AC 106 is operatively coupled to one or more APs 104 through wired or wireless connections, and wherein the AC 106 manages the APs 104 and handles functions such as automatic adjustments to RF power, channels, authentication, and security. ACs 106, commonly also referred to as WIFI Controllers or simply as Controllers, can be connected to APs 104 through one or more network devices (not shown) such as routers, switches, hubs, among other controllers and devices.

In one embodiment, as illustrated in FIG. 1, AC 106 is typically monitored by a network administrator 108, who, through the AC 106, manages and controls the APs and computing devices 102 connected thereto. Administrator 108 can be enabled so as to access each AP 104 through the interface present on the AC 106 and debug/manage each AP 104 as and when the need arises. Architecture 100 of FIG. 1 further comprises a firewall 110 that is operatively connected with the AC 106 and allows computing devices, directly or indirectly connected thereto, to access Internet 112. Firewall 110 functions as a mechanism for monitoring and controlling flow of data packets in the form of requests for web pages or request for specific information from/to computing devices 102. Firewall 110 therefore controls the flow of data packets that are passed from the computing devices 102 to Internet 112 and from Internet 112 to computing devices 102 based on type, kind, or other attributes of data packets. Firewall 110 can in turn be coupled with a router or a switch or any other appropriate network device that enables routing and other allied functions for tramission/reception of traffic from/to Internet 112.

According to one embodiment, controller 106 can include one or more processors and a communication interface device along with one or more internal data storage devices operatively coupled to the one or more processors. Controller 106 can initally be configured to assign a unique identifier to one or more APs 104, wherein the unique identifier is not an Internet Protocol (IP) address associated with the AP 104. The unique identifier can be any unique number or alphanumeric sequence, which remains fixed for each AP and does not vary based on the controller 106 with which it is associated.

According to one embodiment, once the APs are associated with unique identifiers, an interface such as command line interface or graphical user interface can be provided on the AC to a user/administrator through which commands are provided by the user/administrator in order to access and manage one or more APs. In an implementation, a text based command line interface (CLI) of controller 106 can be provided on the computing device of the network administrator 108, which allows the administrator 108 to issue commands and access desired APs based on their respective unique identifiers. In another implementation, interface of the controller 106 can also enable presentation of APs in a defined layout or format such as in the form of a binary tree, mesh topology, star topology, among such other formats. Display of AP's in such a single view format enables efficient access to the desired AP and viewing of the hierarchy and relationships between APs.

According to another embodiment, CLI of controller 106 is used for managing one or more APs 104 that are operatively coupled with the controller 106, wherein management of APs 104 comprises debugging, controlling, changing configurations, among other allied activities of the AP. According to yet another embodiment, access to first AP 104 through the CLI of controller 106 enables CLI of the first AP 106 and displays the first AP CLI prompt to the user, based on which the user can then issue commands to the first AP. For instance, a user can use the CLI of controller 106 to enter commands, such as "execute AP_53", which can then help enter into the AP having unique identifier of 53 and can further enable the CLI of AP having unique identifier of 53. Enablement of the CLI of AP having unique identifier of 53 can help the user to execute further commands for managing, debugging, and controlling the respective AP.

According to another embodiment, once the CLI of a first AP is enabled, upon completion of the desired set of activities on the first AP, the CLI of the first AP can be used to return back to the CLI of the controller 106. Alternatively, the CLI of the first AP can be also used to go to the CLI of a second AP 104, wherein access to the second AP enables the CLI of the second AP and displays the second AP CLI prompt to the user, based on which the user may issue commands to the second AP.

It should be appreciated that the above mentioned architecture 100 of the present invention is an exemplary illustration and that any other layout or configuration of the network comprising APs and Acs can be designed and architected, which would be completely within the scope of the present invention. Each AC can be operatively connected to one or more APs through one or more of Control and Provisioning of Wireless Access Points (CAPWAP), telnet, Secure Shell (SSH), among other such protocols.

Figure 2:
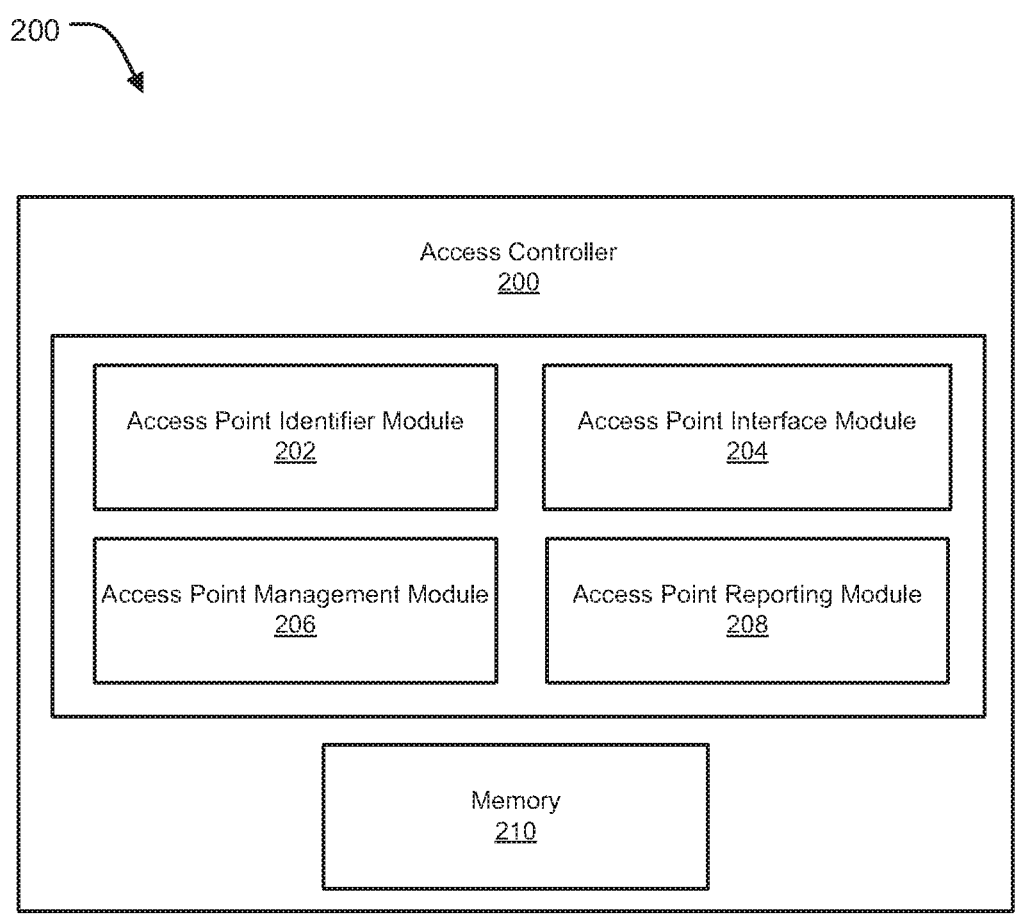
FIG. 2 illustrates exemplary functional modules of an access controller in accordance with an embodiment of the present invention.

One or more of the above mentioned functions can be explained with respect to functional modules illustrated in FIG. 2 of the present invention. FIG. 2 illustrates exemplary functional modules of an access controller in accordance with an embodiment of the present invention. FIG. 2 shows an access controller 200 having an access point identifier module 202, an access point interface module 204, an access point management module 206 and an access point reporting module 208, wherein one or more of these modules are operatively coupled with a memory 210 of access controller 200. It should be appreciated that even though the present example is described with reference to the abovementioned four modules, more or fewer functional module can always be implemented and would be within the scope of the present invention. Furthermore, even though the functional modules are embodied in access controller 200, it will be appreciated that one or more of the functional modules may be stored within and/or implemented by another device/system and operatively coupled with access controller 200.

According to one embodiment, access point identifier module 202 is configured to identify one or more APs that are connected to AC 200 and assign a serial number or unique identification number to the identified APs. The unique identification number can include any number that uniquely represents each AP and is permanently fixed and associated with the respective AP. The unique identification number can also include any other representation such as an alphanumeric number a key string, among other such representations, wherein, once each AP has been assigned a unique identification number, AC 200 can access one or more APs using their respective unique identification numbers, which remain fixed and hence easy to maintain.

According to one embodiment, access point interface module 204 is configured to allow a user and/or network administrator to interface and/or interact with one or more APs through AC. In order to allow a convenient and efficient access to one or more APs by the administrator and/or user from the interface of the controller 200, the one or more APs can initially be represented in a pre-defined and desired format. In an instance, APs can be shown on the interface of the access controller 200 in the form of a tree (binary tree for example) or as a mesh, among other known or customized formats. It should be appreciated that any other known layout format that enables easy and efficient understanding of the pattern of the APs that the AC 200 is connected to, is within the scope the present invention. In an instance, a binary tree structure based layout of the APs can help understand the geographical location of each AP along with helping evaluate connectivity patterns of APs that are connected to AC 200. In an alternate instance, instead of a defined layout, unique identification numbers can also be simply listed on the interface of AC 200. A common layout showing all the APs together in a single view can also help a cloud-based AC 200 in centralizing access of all APs, among other Wi-Fi enabled network elements. According to one embodiment, APs of the present invention include APs that are directly or indirectly connected with AC 200.

According to another embodiment, interface of AC 200 can include a command line interface (CLI) and/or graphical user interface (GUI), wherein, in an implementation, an administrator can initially log onto the access controller system of the present invention and then execute commands to view the layout of APs that the controller 200 manages in a single view. Administrator can then, using for instance, a CLI, access a desired access point through defined commands such "execute AP_43", which commands can help the administrator to log into the respective AP and access its respective CLI, using which the concerned AP can then be managed for defects or debugging or statistic information collection. Therefore, access to a first AP through the CLI of controller 200 enables an AP CLI of the first AP and displays the first AP CLI prompt to the user, based on which the user can then issue commands to the first AP for managing, debugging, and controlling the respective AP.

According to another embodiment, once the CLI of a first AP is enabled, upon completion of the desired set of activities on the first AP, the CLI of the first AP can be used to return back to the CLI of the controller 106. This can be done by a command such as "return AC", which would then enable the CLI of controller 200 and enable access to other APs of interest. In an alternative embodiment, CLI of the first AP can be also used to access a second AP 104, wherein access to the second AP enables AP CLI of the second AP and displays the second AP CLI prompt to the user, based on which the user may issue commands to the second AP. This can be done by a command such as "execute AP_23" from the CLI of the first AP, which can then enable the CLI of AP having unique identifier of 23.

According to an embodiment, interface of controller 200 can include a graphical user interface (GUI), wherein the GUI can include forms, buttons, among other input and command options that can enable access to a desired AP, wherein once an AP has been connected to, either its own GUI or CLI can be used to manage and debug the same. In an instance therefore, a seamless integration of GUI and CLI can also be incorporated, wherein one or more APs can be accessed using their respective GUI whereas the others can be implemented with a CLI.

According to one embodiment, access point management module 206 is configured to manage, control and/or debug an accessed access point through CLI of the respective access point. Management module 206 can also be configured to modify settings in APs, configure settings, or implement updates in the APs through the respective interface of the AP in context. It should be appreciated that settings or data that is to be communicated between AP and its AC can be stored on either of the devices and any such structural or configuration change during management of AP is completely within the scope of the present invention. In an embodiment, once the intended action on a given AP is complete, CLI of the AP can be used to return back to the CLI of AC. Alternatively, CLI of the AP can also be used to access a second AP and then manage the second AP using its respective CLI.

According to one embodiment, access point reporting module 208 is configured to receive data obtained from management of access point and analyze the data to report the same to the network administrator, or the system engineer or internal users as desired. Reporting module can be configured to present reports and data in one or more desired formats and include any information that is desired to be seen by the concerned stakeholder. Combined reports can also be generated for multiple managed APs at the same time so that APs can be compared and evaluated/assessed together to take necessary corrective actions. In an exemplary embodiment, reporting module 208 can be configured to generate a report indicating one or more reasons for managing identified access point, steps taken during management of access point, defects analyzed and evaluated, status of the access point, among other like information.

Any data including unique identifiers, IP addresses, configuration settings, output from debugging of APs, among other such data can be stored in memory 210. Memory 210 of controller 200 can be operartively coupled with one or more modules and configured to receive and store data in a defined structure and pattern as indicated by the respective module. According to one embodiment, memory 210 of the present invention can also be configured outside the controller 200.

Figure 3:
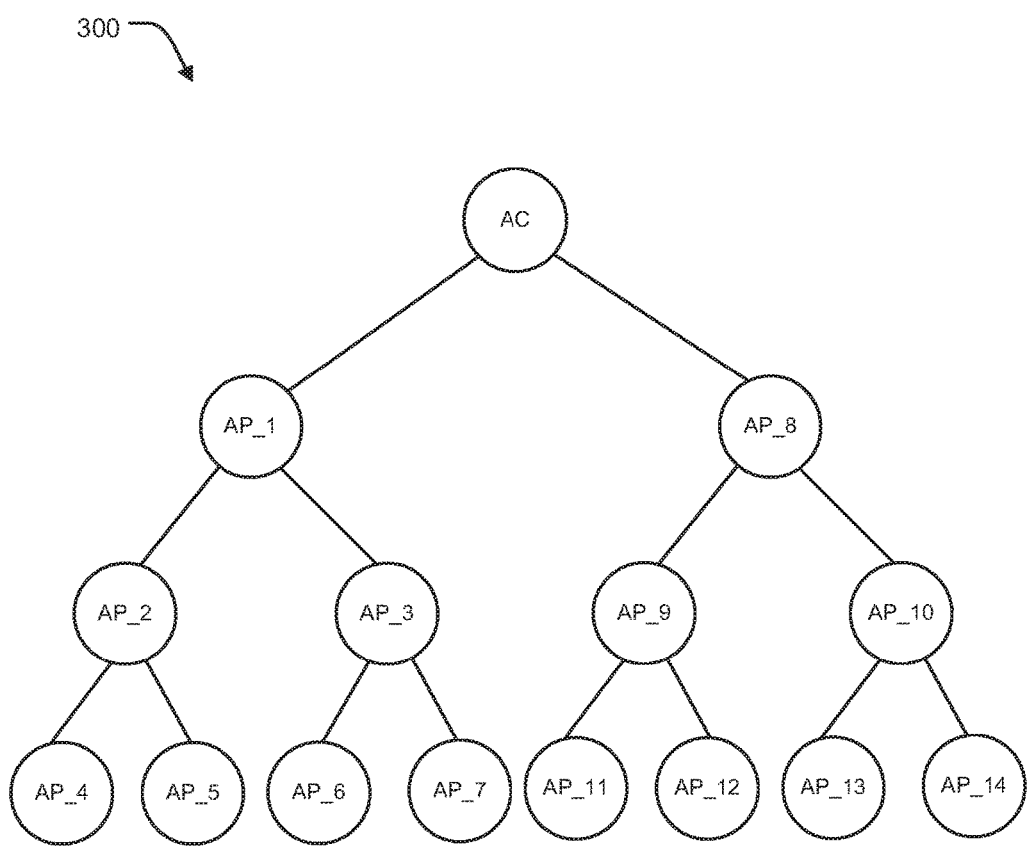
FIG. 3 illustrates an exemplary logical representation of a set of access points managed by an access controller in accordance with an embodiment of the present invention.

FIG. 3 illustrates an exemplary logical representation 300 of a set of access points managed by an access controller in accordance with an embodiment of the present invention. FIG. 3 illustrates the interface of controller/AC that enables it to have a single view representation of the APs that it manages. As mentioned above, any other representation such as mesh, ring, or star type represntation can also be used for viewing the layout of APs that each AC is connected to. As can be seen from FIG. 3, AC has been represented as the top level node on the interface of AC, wherein APs that each AC manages have been shown as child nodes, wherein AP_1 and AP_8 are second level nodes; AP_2, AP_3, AP_9, and AP_10 are third level nodes; and AP_4, AP_5, AP_6, AP_7, AP_11, AP_12, AP_13, and AP_14 are fourth level nodes. It should be appreciated that this is merely an exemplary representation of the APs and any other format/layout of the APs is completely within the scope of the present invention.

According to one embodiment, a tree based layout of APs that each AC manages can also be seen on the CLI of the AC, wherein from the view, the AC can then choose the AP_that it would like to access (say AP_13) and then select the same to enable the CLI of AP_13. Alternatively, once the interface layout of the APs has been viewed, CLI of the AC can be executed/enabled and defined commands such as "execute AP_13" can be used to enable the CLI of AP_13 and manage the respective AP_accordingly.

FIGS. 4A and 4B (collectively, "FIG. 4") illustrate exemplary command line interfaces 400 and 450 for managing access points in accordance with an embodiment of the present invention. FIG. 4A represents a situation in which a second AP is directly accessed from the CLI of the first AP without going through the contoller. As can be seen, after entering the AP tree, AP_3 has been accessed, post which the AP_3 is managed using the CLI of AP_3. Once the management of AP_3 is over, findings from the management such debugging reports, errors found, and resolutions done can be reported back to AC, post which, AP_7 is directly entered using the CLI of AP_3, which enables the CLI of AP_7 and helps manage the AP_7 (referrred to as "debug AP_7") and report the findings to the AC or directly to any other concerned stakeholder.

FIG. 4B, on the other hand, represents a situation in which a second AP is accessed from the CLI of the first AP after going back to the contoller. As can be seen, after entering the AP tree, AP_3 has been accessed and managed using the CLI of AP_3. Once the management of AP_3 is over, findings from the management such debugging reports, errors found, and resolutions done can be reported back to AC, post which, the control again returns back to AC through the command "return AC". Once the CLI of the controller/AC is enabled, a new command can be initiated to enable the CLI of AP_7, which helps manage the AP_7 (referrred to as "debug AP_7") and report the findings to the AC or directly to any other concerned stakeholder. Once the management of AP_7 is over, the control can then again return back to the AC through the command "return AC".

Figure 5:
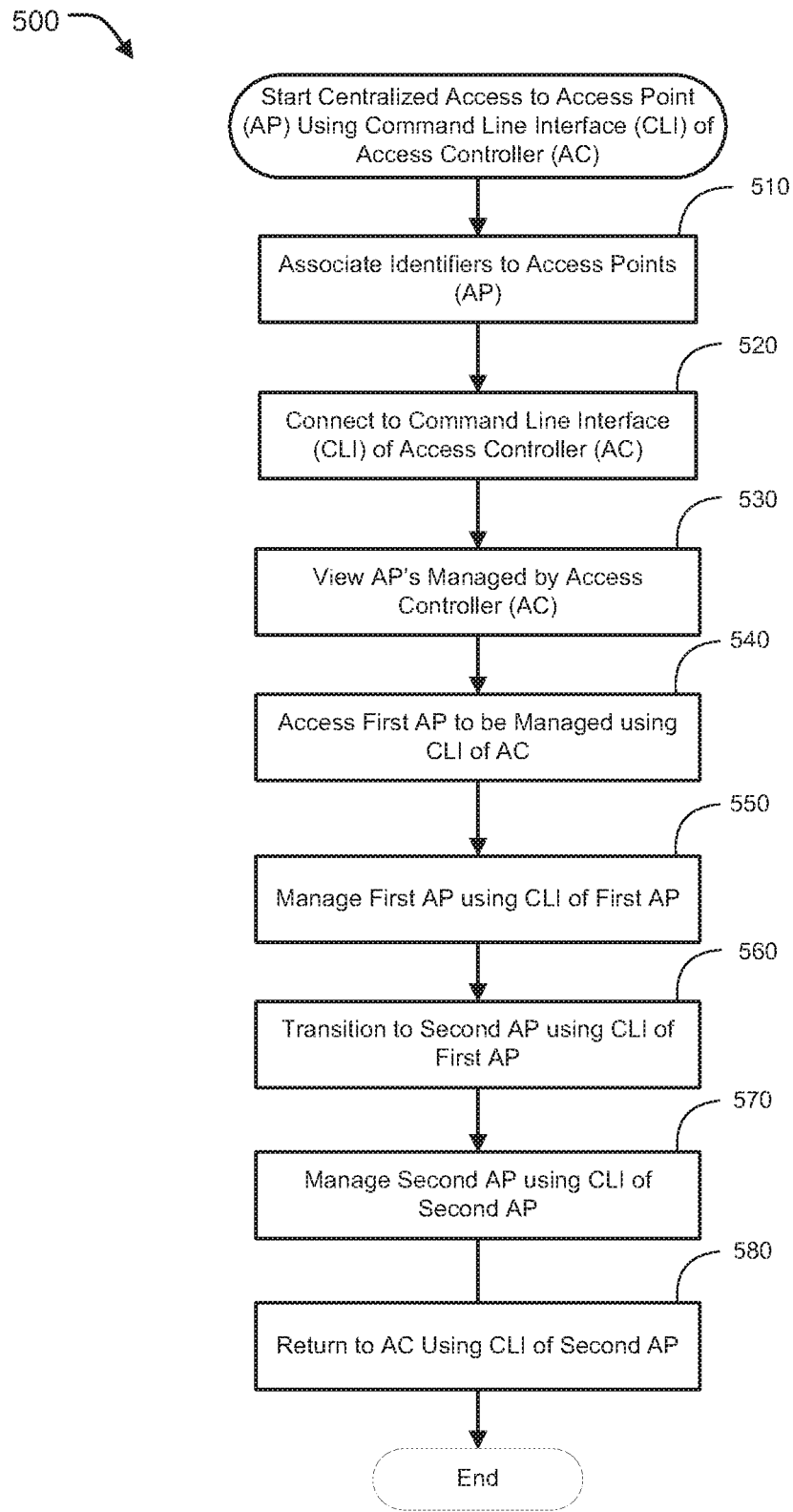
FIG. 5 is a flow diagram illustrating access point management processing via a command line interface in accordance with an embodiment of the present invention.

FIG. 5 is a flow diagram 500 illustrating access point management processing via a command line interface in accordance with an embodiment of the present invention.

At block 510, a unique identifier is associated to each AP, wherein the identifier is not the IP address of the AP and is configured to be a fixed identifier that can enable easy and consistent access to the AP. At block 520, interface of the AC can be activated and CLI of the AC can be enabled to help the AC access the APs that it manages. At block 530, a defined layout of the APs can be presented to the AC such that the AC, through its respective interface, is able to view the APs that it manages in a single view.

At block 540, CLI of the AC can be used to access a first AP through a defined command, which command enables the CLI of the first AP and allows management of the first AP using its respective CLI. At block 550, the first AP is managed using its respective CLI, wherein management of AP includes, but is not limited to, debugging, controlling, configuring, activating, authenticating, among other allied functions that are intended to be performed by the network administrator through the interface of the AC.

At block 560, a second AP can be accessed using the CLI of the first AP through one or more defined commands (such as execute AP_n). Access to the second AP enables the CLI of the second AP, which then assists in handling and managing functions of the second AP. At block 570, the second AP is managed using the CLI of the second AP. Finally, at block 580, once the management of second AP is complete, the control can return back to the AC through one or more commands, which when executed, enable the CLI of the AC.

Figure 6:
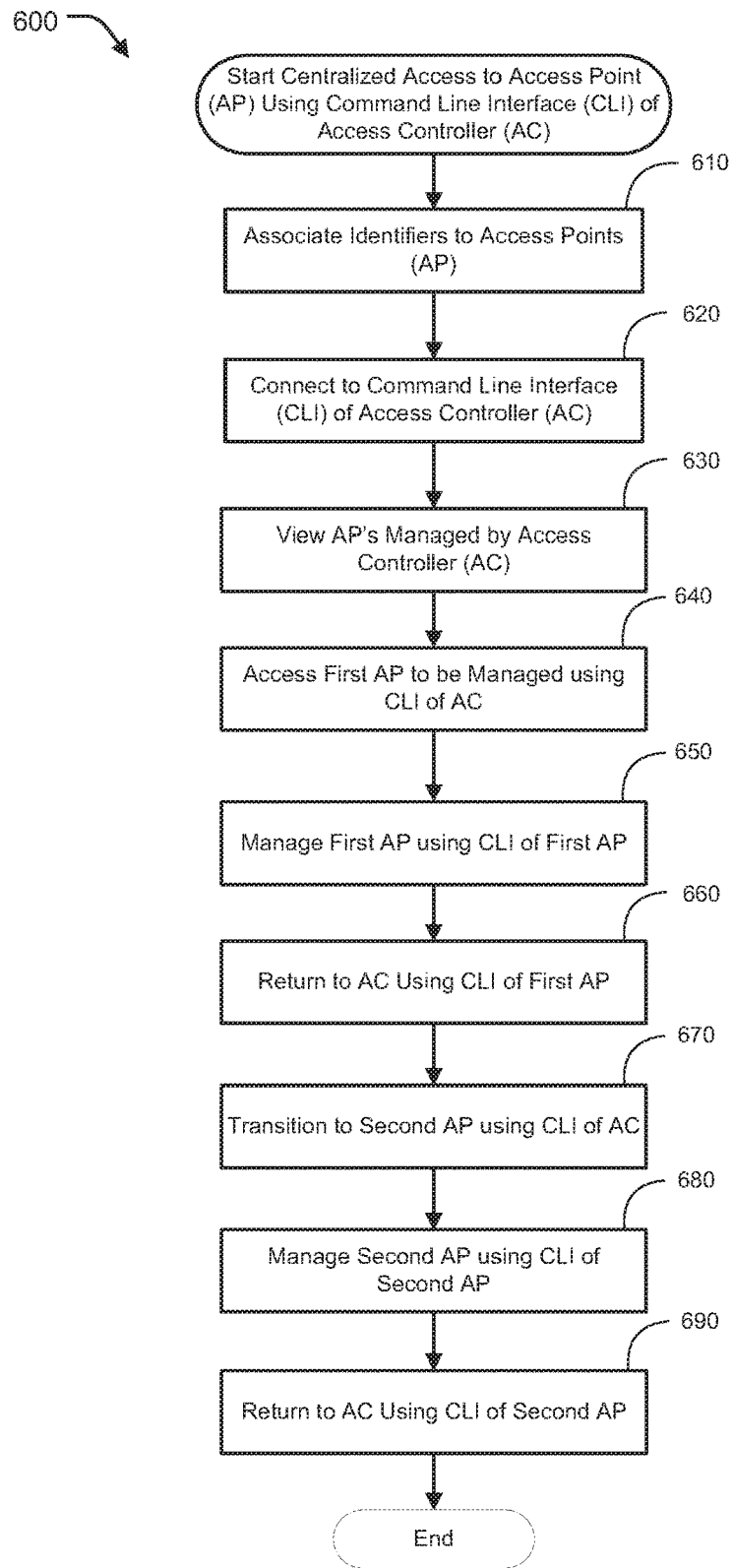
FIG. 6 is a flow diagram illustrating access point management processing via a command line interface in accordance with an alternative embodiment of the present invention.

FIG. 6 is a flow diagram 600 illustrating access point management processing via a command line interface in accordance with an alternative embodiment of the present invention.

At block 610, a unique identifier is associated to each AP, wherein the identifier is not the IP address of the AP and is configured to be a fixed identifier that can enable easy and consistent access to the AP. At block 620, interface of the AC can be activated and CLI of the AC can be enabled to help the AC access the APs that it manages. At block 630, a defined layout of the APs can be presented to the AC such that the AC, through its respective interface, is able to view the APs that it manages in a single view.

At block 640, CLI of the AC can be used to access a first AP through a defined command, which command enables the CLI of the first AP and allows management of the first AP using its respective CLI. At block 650, the first AP is managed using its respective CLI, wherein management of AP includes, but is not limited to, debugging, controlling, configuring, activating, authenticating, among other allied functions that are intended to be performed by the network administrator through the interface of the AC.

At block 660, control returns back to the AC through one or more commands, which when executed, enable the CLI of the AC. At block 670, a second AP can be accessed using the CLI of the AC through one or more defined commands (such as execute AP_n). Access to the second AP enables the CLI of the second AP, which then assists in handling and managing functions of the second AP. At block 680, the second AP is managed using the CLI of the second AP. Finally, at block 690, once the management of second AP is complete, the control can return back to the AC through one or more commands that are run on the CLI of second AP, which when executed, enable the CLI of the AC.

Figure 7:
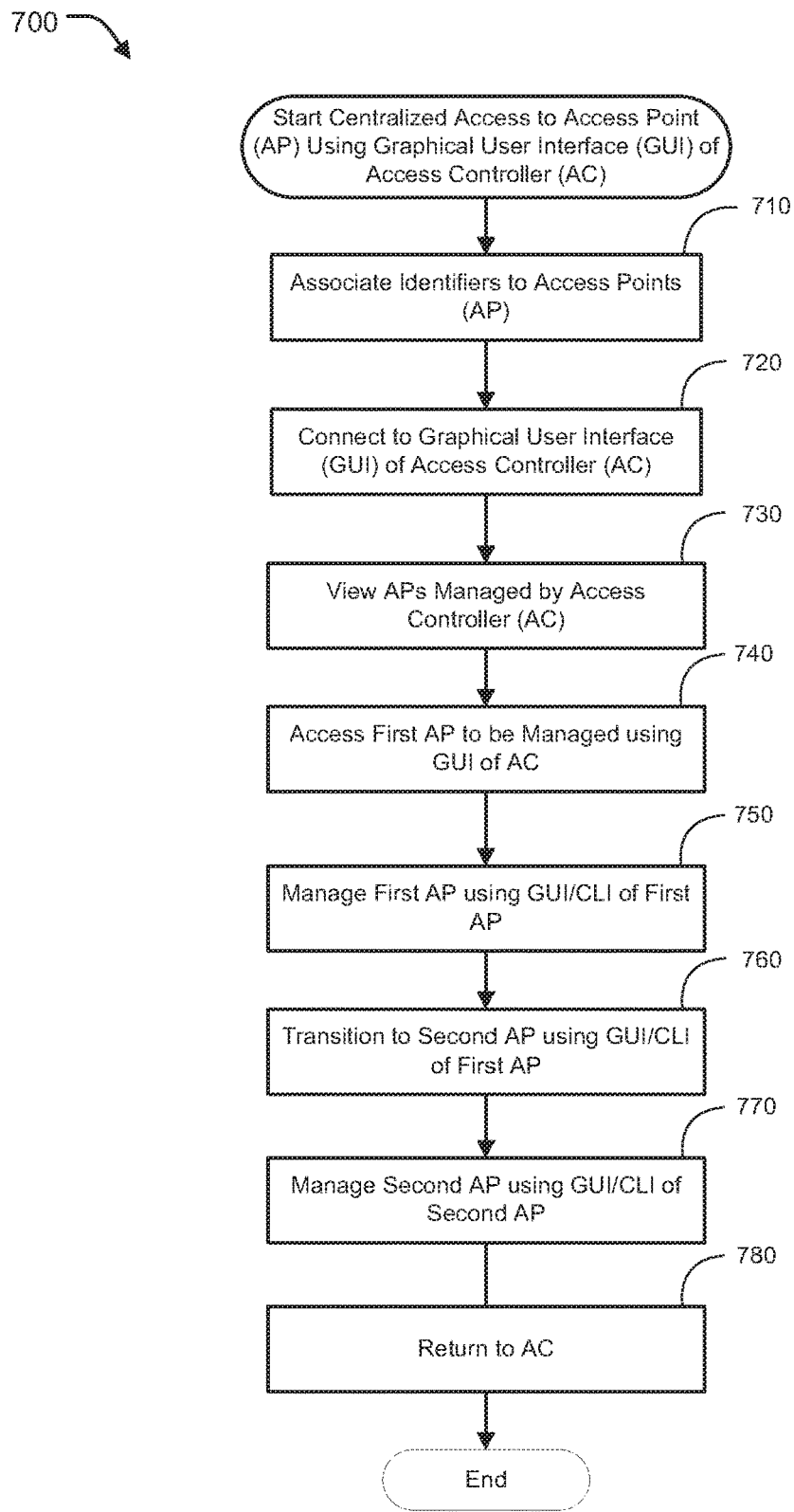
FIG. 7 is a flow diagram illustrating access point management processing via a graphical user interface (GUI) in accordance with an embodiment of the present invention.

FIG. 7 is a flow diagram 700 illustrating access point management processing via a graphical user interface (GUI) in accordance with an embodiment of the present invention.

At block 710, a unique identifier is associated to each AP, wherein the identifier is not the IP address of the AP and is configured to be a fixed identifier that can enable easy and consistent access to the AP. At block 720, GUI of the AC can be activated and enabled to help the AC access the APs that it manages. At block 730, a defined layout of the APs can be presented on the GUI of the AC such that the AC, through its respective GUI, is able to view the APs that it manages in a single view.

At block 740, GUI of the AC can be used to access a first AP through a defined command, which command enables the interface of the first AP and allows management of the first AP using its respective interface. In an embodiment, interface of each AP can be GUI or a CLI depending on the configuration. At block 750, the first AP is managed using its respective CLI/GUI, wherein management of AP includes, but is not limited to, debugging, controlling, configuring, activating, authenticating, among other allied functions that are intended to be performed by the network administrator through the interface of the AC.

At block 760, GUI/CLI of the first AP can be used to access a second AP and enable the CLI/GUI of the second AP through one or more defined commands (such as execute AP_n). Access to the second AP enables the CLI/GUI of the second AP, which then assists in handling and managing functions of the second AP. At block 770, the second AP is managed using the CLI/GUI of the second AP. Finally, at block 780, once the management of second AP is complete, the control can return back to the AC through one or more commands that are run on the CLI/GUI of second AP, which when executed, enables the GUI of the AC.

Figure 8:
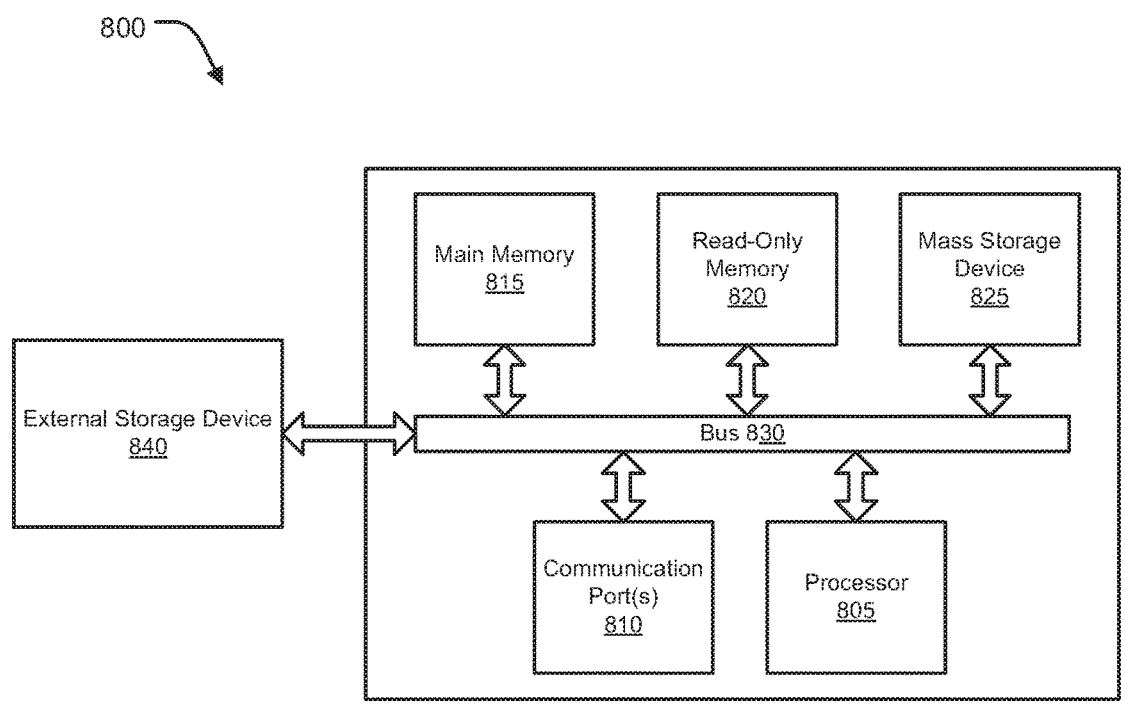
FIG. 8 is an exemplary computer system in which or with which embodiments of the present invention may be utilized.

FIG. 8 is an example of a computer system 800 with which embodiments of the present disclosure may be utilized. Computer system 800 may represent or form a part of an access controller (e.g., access controller 106), an access point (e.g., access point 104a-c), a server, an administrative terminal/computer or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 800 includes a bus 830, a processor 805, communication port 810, a main memory 815, a removable storage media 840, a read only memory 820 and a mass storage 825. A person skilled in the art will appreciate that computer system 800 may include more than one processor and communication ports.

Examples of processor 805 include, but are not limited to, an Intel® Xeon® or Itanium® processor(s), or AMD® Opteron® or Athlon MP® processor(s), Motorola® lines of processors, FortiSOC™ system on a chip processors or other future processors. Processor 805 may include various modules associated with messaging security gateway 200 as described with reference to FIG. 2. For example, processor 805 may include one or more of mail reception module 202, domain name validation module 204, validity update module 206 and send/discard module 208.

Communication port 810 can be any of an RS-232 port for use with a modem based dialup connection, a 10/100 Ethernet port, a Gigabit or 10 Gigabit port using copper or fiber, a serial port, a parallel port, or other existing or future ports. Communication port 810 may be chosen depending on a network, such a Local Area Network (LAN), Wide Area Network (WAN), or any network to which computer system 800 connects.

Memory 815 can be Random Access Memory (RAM), or any other dynamic storage device commonly known in the art. Read only memory 820 can be any static storage device(s) such as, but not limited to, a Programmable Read Only Memory (PROM) chips for storing static information such as start-up or BIOS instructions for processor 805.

Mass storage 825 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 830 communicatively couples processor(s) 805 with the other memory, storage and communication blocks. Bus 830 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 805 to system memory.

Optionally, operator and administrative interfaces, such as a display, keyboard, and a cursor control device, may also be coupled to bus 830 to support direct operator interaction with computer system 800. Other operator and administrative interfaces can be provided through network connections connected through communication port 810.

Removable storage media 840 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:
    decoupling, by an Access Controller (AC) that manages a plurality of Access Points (APs) of a private Internet Protocol (IP) network, identities of each AP of the plurality of APs from potentially transient IP addresses of the plurality of APs by assigning a unique identifier to each of the plurality of APs;
    centralizing access to the plurality of APs, by presenting, by the AC, an AC graphical user interface (GUI) to a network administrator through which commands are provided by the network administrator and through which the network administrator is provided with the ability to interact with the plurality of APs without requiring initiation by the AC of a separate network protocol session for each AP of the plurality of APs; and
    interacting, by the AC, with a first AP of the plurality of APs based on a command received from the network administrator through the AC GUI and based upon the first AP's assigned unique identifier, wherein said interacting with the first AP enables a first AP GUI or command line interface (CLI) of the first AP through which the network administrator is provided with an ability to issue a plurality of commands to the first AP.

2. The method of claim 1, wherein the first AP GUI or CLI of the first AP further permits access to a second AP GUI or CLI of a second AP of the plurality of APs through which the network administrator is provided with an ability to issue the plurality of commands to the second AP.

3. The method of claim 1, wherein a first command of the plurality of commands causes the first AP to return a report indicative of a current status of the first AP.

4. The method of claim 1, wherein a second command of the plurality of commands causes the first AP to update one or more configuration settings of the first AP.

5. The method of claim 2, wherein the first AP GUI or CLI of the first AP enables access back to the AC GUI.

6. The method of claim 1, further comprising presenting a graphical representation of relationships among the plurality of APs and of relationships between each of the plurality of APs, if any, with the AC within the AC GUI.

7. The method of claim 6, wherein the graphical representation is presented in a form of one or more of a tree layout, a mesh layout, a star layout and a ring layout.

8. The method of claim 6, wherein the graphical representation provides a single view that enables the network administrator to visualize an entire topology represented by the relationships among the plurality of APs and the relationships between each of the plurality of APs, if any, with the AC.

9. The method of claim 8, wherein the graphical representation displays the assigned unique identifier proximate to representations of each of the plurality of APs.

10. The method of claim 1, wherein the AC comprises a cloud-based AC and performs said interacting remotely.

11. A non-transitory computer-readable storage medium embodying a set of instructions, which when executed by one or more processors of an Access Controller (AC) that manages a plurality of Access Points (APs) of a private Internet Protocol (IP) network, cause the one or more processors to perform a method comprising:

decoupling identities of each AP of the plurality of APs from potentially transient IP addresses of the plurality of APs by assigning a unique identifier to each of the plurality of APs;

centralizing access to the plurality of APs, by presenting an AC graphical user interface (GUI) to a network administrator through which commands are provided by the network administrator and through which the network administrator is provided with the ability to interact with the plurality of APs without requiring initiation by the AC of a separate network protocol session for each AP of the plurality of APs; and interacting with a first AP of the plurality of APs based on a command received from the network administrator through the AC GUI and based upon the first AP's assigned unique identifier, wherein said interacting with the first AP enables a first AP GUI or command line interface (CLIO of the first AP through which the network administrator is provided with an ability to issue a plurality of commands to the first AP.

12. The non-transitory computer-readable storage medium of claim 11, wherein the first AP GUI or CLI of the first AP further permits access to a second AP GUI or CLI of a second AP of the plurality of APs through which the network administrator is provided with an ability to issue the plurality of commands to the second AP.

13. The non-transitory computer-readable storage medium of claim 11, wherein a first command of the plurality of commands causes the first AP to return a report indicative of a current status of the first AP.

14. The non-transitory computer-readable storage medium of claim 11, wherein a second command of the plurality of commands causes the first AP to update one or more configuration settings of the first AP.

15. The non-transitory computer-readable storage medium of claim 12, wherein the first AP GUI or CLI of the first AP enables access back to the AC GUI.

16. The non-transitory computer-readable storage medium of claim 11, wherein the method further comprises presenting a graphical representation of relationships among the plurality of APs and of relationships between each of the plurality of APs, if any, with the AC within the AC GUI.

17. The non-transitory computer-readable storage medium of claim 16, wherein the graphical representation is presented in a form of one or more of a tree layout, a mesh layout, a star layout and a ring layout.

18. The non-transitory computer-readable storage medium of claim 16, wherein the graphical representation provides a single view that enables the network administrator to visualize an entire topology represented by the relationships among the plurality of APs and the relationships between each of the plurality of APs, if any, with the AC.

19. The non-transitory computer-readable storage medium of claim 18, wherein the graphical representation displays the assigned unique identifier proximate to representations of each of the plurality of APs.

20. The non-transitory computer-readable storage medium of claim 11, wherein the AC comprises a cloud-based AC and performs said interacting remotely.

* * * * *